(12) United States Patent
Byun (10) Patent No.: US 9,093,723 B2
(45) Date of Patent: Jul. 28, 2015

(54) RECHARGEABLE BATTERY

(71) Applicant: Samsung SDI Co., Ltd., Yongin-si, Gyeonggi-do (KR)

(72) Inventor: Bo-Hyun Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 136 days.

(21) Appl. No.: 13/671,551

(22) Filed: Nov. 7, 2012

(65) Prior Publication Data

US 2013/0330574 A1    Dec. 12, 2013

Related U.S. Application Data

(60) Provisional application No. 61/657,579, filed on Jun. 8, 2012.

(51) Int. Cl.
*H01M 10/42* (2006.01)
*H01M 2/34* (2006.01)

(52) U.S. Cl.
CPC ............ *H01M 10/4257* (2013.01); *H01M 2/34* (2013.01); *H01M 2/348* (2013.01); *H01M 2200/00* (2013.01)

(58) Field of Classification Search
None
See application file for complete search history.

(56) References Cited

U.S. PATENT DOCUMENTS

| 2007/0020509 A1* | 1/2007 | Kim | 429/62 |
| 2007/0202396 A1* | 8/2007 | Jung | 429/174 |
| 2008/0226974 A1 | 9/2008 | Jang et al. | |
| 2009/0122455 A1 | 5/2009 | Jang et al. | |
| 2009/0263711 A1* | 10/2009 | Kim et al. | 429/164 |
| 2010/0092860 A1* | 4/2010 | Seo et al. | 429/178 |
| 2012/0142230 A1 | 6/2012 | Baek | |

FOREIGN PATENT DOCUMENTS

| EP | 2 180 538 A1 | 4/2010 |
| EP | 2 271 192 A2 | 1/2011 |
| EP | 2 328 210 A1 | 6/2011 |
| JP | 2006-114468 A | 4/2006 |
| KR | 10-2008-0084416 | 9/2008 |

OTHER PUBLICATIONS

EPO Search Report dated Sep. 23, 2013, for corresponding European Patent application 13170167.4, (5 pages).
Patent Abstracts of Japan Publication No. 2006-114468 dated Apr. 27, 2006, and Machine English Translation, 19 pages.

* cited by examiner

*Primary Examiner* — Patrick Ryan
*Assistant Examiner* — Haixia Zhang
(74) *Attorney, Agent, or Firm* — Christie, Parker & Hale, LLP (57) ABSTRACT

A rechargeable battery according to an exemplary embodiment of the present invention includes a case, an electrode assembly received by the case, a cap plate combined with the opening of the case, a protective circuit board electrically connected with a first electrode of the electrode assembly, and a protective device attached on a top surface or side surface of the protective circuit board, electrically connected with a second electrode of the electrode assembly, and electrically connected with the protective circuit board.

15 Claims, 10 Drawing Sheets

RECHARGEABLE BATTERY

CROSS-REFERENCE TO RELATED APPLICATION

This application claims priority to and the benefit of U.S. Provisional Application No. 61/657,579, filed on Jun. 8, 2012, in the U.S. Patent and Trademark Office, the entire content of which is incorporated herein by reference.

BACKGROUND

1. Field

The following description relates generally to a rechargeable battery. More particularly, the following description relates to a rechargeable battery including a protective circuit module having an improved (and/or simplified) structure.

2. Description of the Related Art

Unlike a primary battery that is not rechargeable, a rechargeable battery can be repeatedly charged and discharged. A small-capacity rechargeable battery is used for small portable electronic devices (such as mobile phones, notebook computers, camcorders, or the like), while a large-capacity rechargeable battery is used as a motor-driving power source or large-capacity power storage device for a hybrid vehicle, and the like.

The rechargeable battery can have an operation voltage of about 3.6V. Overcharge or over-discharge may occur while the rechargeable battery is repeatedly charged and discharged. Accordingly, gas or heat may be generated due to decomposition of an electrolyte solution of the rechargeable battery that is caused by the overcharge or over-discharge of the rechargeable battery, which may lead to deteriorated performance or damage of the rechargeable battery.

The protective circuit module is used to prevent (protect from) the over charge or over-discharge of the rechargeable battery.

The protective circuit module includes a protective device and a protective circuit board. The protective circuit board is electrically connected with the protective device and a bare cell to form a current path between the protective device and the bare cell.

For example, the protective device is electrically connected to a negative electrode of the rechargeable battery. The protective circuit board is electrically connected to a positive electrode of the rechargeable battery. The protective device and the protective circuit board are electrically connected to form the current path between the protective device, the protective circuit board, and the negative and positive electrodes.

In this case, the protective device and the protective circuit board are sequentially stacked and combined on a case. For example, the protective circuit module may be formed by disposing the protective device on a cap plate which is combined with an opening of the case and attaching the protective circuit board on the protective device.

In this case, there is no need for an additional element for connecting the protective device and the protective circuit board with the electrode terminals, respectively, in order to electrically connect the protective device and the protective circuit board with the negative and positive electrodes.

However, there is a problem in that it is difficult to combine the bare cell with the protective circuit module including the protective device and the protective circuit board.

Also, the additional structure, which is required to connect the bare cell with the protective device and the protective circuit board, may result in an increase in volume of the protective circuit module. Also, there is another problem in that a process of assembling the rechargeable battery may become complicated.

The above information disclosed in this Background section is only for enhancement of understanding of the background of the described technology and therefore it may contain information that does not form the prior art that is already known in this country to a person of ordinary skill in the art.

SUMMARY

An aspect of an embodiment of the present invention is directed toward a rechargeable battery including a protective circuit module having a small volume, where the protective device and the protective circuit board are easily combined.

Another aspect of an embodiment of the present invention is directed toward a rechargeable battery formed through a simplified process of assembling the bare cell and the protective circuit module.

A rechargeable battery according to an embodiment includes a case, an electrode assembly received by the case, a cap plate combined with the opening of the case, a protective circuit board electrically connected with a first electrode of the electrode assembly, and a protective device attached to a top surface or side surface of the protective circuit board, electrically connected with a second electrode of the electrode assembly, and electrically connected with the protective circuit board.

According to an embodiment of the present invention, a rechargeable battery is provided. The rechargeable battery includes a bare cell and a protective circuit module. The bare cell includes a case for housing an electrode assembly and a cap plate for capping an opening of the case. The protective circuit module includes a protective circuit board electrically connected with a first electrode of the electrode assembly and a protective device. The protective device includes: a first protective device portion mounted to a first surface of the protective circuit board to be electrically connected with the protective circuit board, and a second protective device portion electrically connected with a second electrode of the electrode assembly and mounted on a second surface of the protective circuit board, the second surface facing oppositely away from the first surface.

In one embodiment, the rechargeable battery further includes a lead tab. The lead tap includes a protective circuit board connecting part electrically connected with the protective circuit board and a cap plate connecting part electrically connected with the first electrode.

In one embodiment, the rechargeable battery further includes a conductive connection member. The conductive connection member includes an electrode terminal part electrically connected with the second electrode and a protective circuit board combining part electrically connected with the second protective device portion.

In one embodiment, the conductive connection member further includes a body electrically connecting the electrode terminal part with the protective circuit board combining part, the body being a curved body curved toward the protective circuit board combining part to be overlapped and attached between the protective circuit board and the cap plate. The protective circuit board may be stacked on the curved body of the conductive connection member. The protective circuit board may include: a protective device connection pattern electrically connected with the first electrode on the first surface; and an electrode connecting part electrically connected with the second electrode via the conductive connection member on the second surface and insulated from the protective device connection pattern.

In one embodiment, the protective circuit board combining part is electrically connected with the second protective device portion on the second surface of the protective circuit board.

In one embodiment, the rechargeable battery further includes an insulation member between the protective circuit board and the cap plate, wherein the conductive connection member is disposed on the insulation member and attached between the protective circuit board and the insulation member. The insulation member may have a terminal combining hole, and the electrode terminal part of the conductive connection member may be connected with the second electrode via a second electrode terminal penetrating through the terminal combining hole.

In one embodiment, the protective device further includes a third protective device portion, and the first and second protective device portions extend from a same side of the third protective device portion along a same direction on the protective circuit board.

In one embodiment, the protective device further includes a third protective device portion mounted on a third surface of the protective circuit board to electrically connect the first protective portion with the second protective device portion, and the first surface of the protective circuit board is connected with the second surface of the protective circuit board via the third surface of the protective circuit board.

In one embodiment, the first protective device portion includes a protective device body and a protective device protrusion extending at one side of the protective device body and electrically connected with the first electrode on the first surface of the protective circuit board, the protective device body including a protective chip or lead; and the second protective device portion includes a fixing part electrically connected with the second electrode on the second surface of the protective circuit board.

In one embodiment, the third protective device portion includes a protective device body extending from and attached to the third surface of the protective circuit board and a protective device supporting part body; the protective device body includes a protective chip or lead; the protective device supporting part body supports a surface of the protective device body; the first protective device portion includes a protective device protrusion extending at one side of the protective device body and electrically connected with the first electrode on the first surface of the protective circuit board; and the second protective device portion includes a supporting part protrusion extending at one side of the protective device supporting part body and electrically connected with the second electrode on the second surface of the protective circuit board. The length (L2) of the protective circuit board may be less than the length (L1) of the protective circuit module, and/or the length (L1) of the protective circuit module may encompass both the length of the protective device body and the length (L2) of the protective circuit board.

In one embodiment, the third protective device portion includes a protective device body extending from and attached to the third surface of the protective circuit board; the protective device body includes a protective chip or lead; the first protective device portion includes a first protective device protrusion extending at one side of the protective device body and electrically connected with the first electrode on the first surface of the protective circuit board; and the second protective device portion includes a second protective device protrusion also extending at the one side of the protective device body, separated from the first protective device protrusion, and electrically connected with the second electrode on the second surface of the protective circuit board. The protective device body may be integrally provided with the first protective device protrusion and the second protective device protrusion.

In one embodiment, the protective circuit board includes an outer terminal for electrically connecting the electrode assembly to an external device. The rechargeable battery may further include an insulating member between the protective circuit board and the cap plate at where the outer terminal is positioned, to protect from a penetration of a lead between the protective circuit board and the cap plate.

In one embodiment, the rechargeable battery further includes a cover covering the protective circuit board and the protective device, and injection molded into a space between the bare cell and the protective circuit module.

In view of the above, according to an embodiment of the present invention, it is possible to provide a rechargeable battery having the protective device and the protective circuit board which are easily combined and to provide the protective circuit module with a small volume. Herein, the protective device and the protective circuit board constitute the protective circuit module.

According to another embodiment of the present invention, it is possible to provide a rechargeable battery formed through a simplified process of assembling the bare cell and the protective circuit module.

DETAILED DESCRIPTION

Hereinafter, embodiments of the present invention will be described in more detail with reference to the accompanying drawings such that it may be easily carried out by those skilled in the art. However, the present invention may be implemented in various different ways, and is not limited to the following embodiments.

In the drawings, the dimensions of layers and regions may be exaggerated for clarity of illustration. It will be understood that when a layer (or film) is referred to as being "on" another layer or substrate, it can be directly on another layer or substrate, or intervening layers may also be present. Further, it will be understood that when a layer is referred to as being "under" another layer, it can be directly under another layer, and one or more intervening layers may also be present. In addition, it will also be understood that when a layer is referred to as being "between" two layers, it can be the only layer between the two layers, or one or more intervening layers may also be present. In the description and drawings, like reference numerals refer to like elements throughout.

Figure 1:
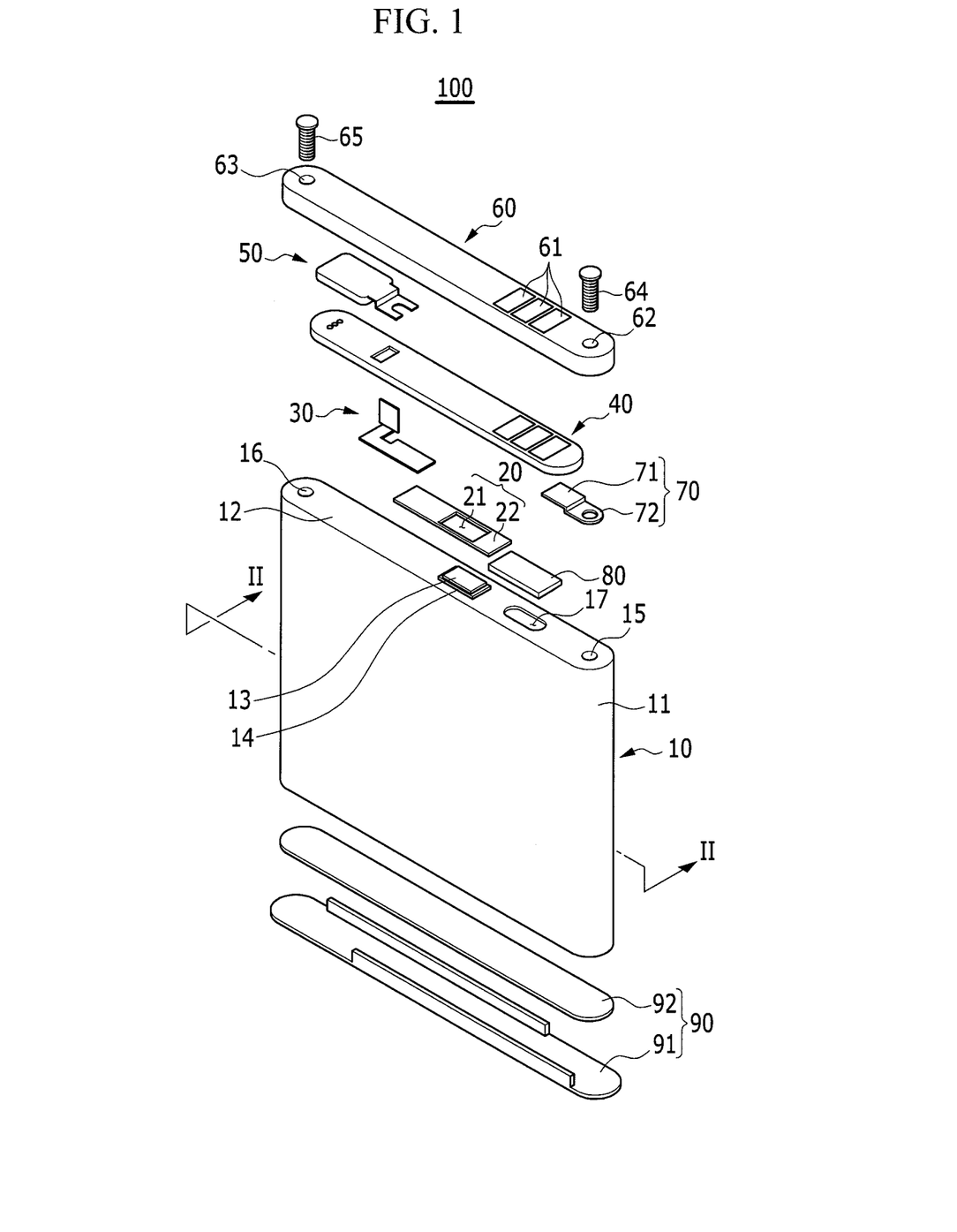
FIG. 1 is an exploded perspective view illustrating a rechargeable battery according to a first embodiment of the present invention.
Figure 2:
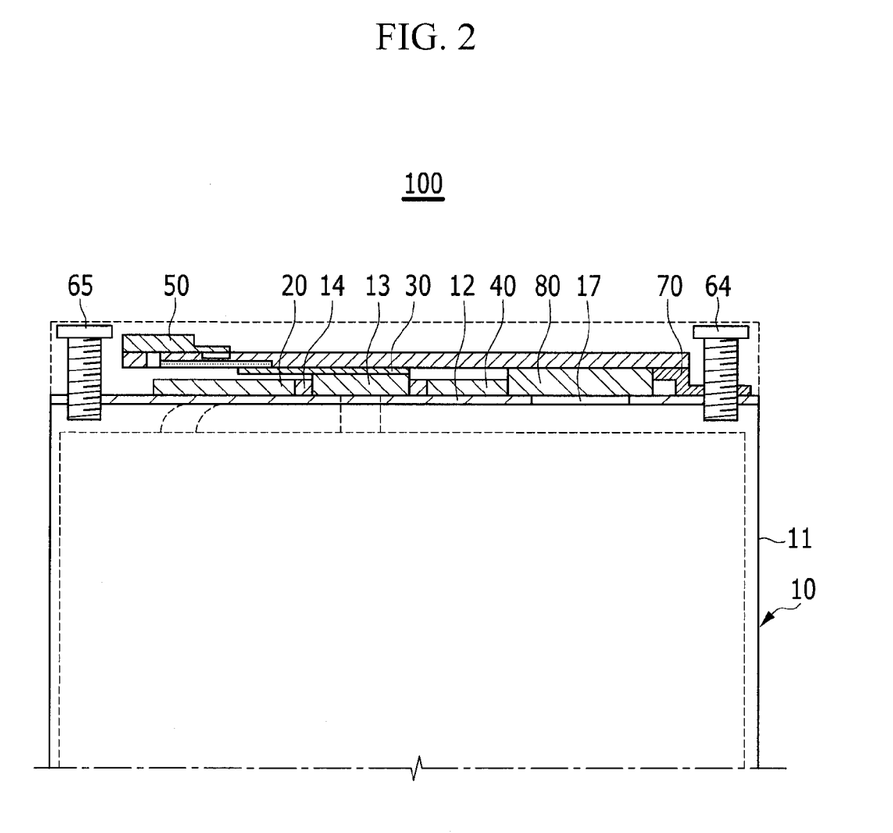
FIG. 2 is a cross-sectional view of the rechargeable battery taken along line II-II in FIG. 1.

FIG. 1 is an exploded perspective view illustrating a rechargeable battery according to a first embodiment of the present invention, and FIG. 2 is a cross-sectional view of the rechargeable battery taken along line II-II in FIG. 1.

Referring to FIGS. 1 and 2, a rechargeable battery 100 according to an embodiment includes a bare cell 10, a first insulation member 20, a conductive connection member 30, a protective circuit module including a protective circuit board 40 and a protective device 50, a top cover 60, a lead tab 70, a second insulation member 80, and a bottom cover 90.

The bare cell 10 according to the embodiment may include a case 11 having a built-in electrode assembly (shown in dash lines), a cap plate 12 attached to an opening of the case 11, an electrode terminal 13 attached to the cap plate 12, a gasket 14 for insulating the electrode terminal 13 and the cap plate 12, first and second combining parts 15 and 16, and a gas outlet 17.

More particularly, the case 11 has an approximately hexahedral shape and an opening at one side thereof. Accordingly, the case 11 may receive the electrode assembly including first and second electrodes and a separator between the first and second electrodes. Herein, the first electrode may be one of a positive electrode or a negative electrode, and the second electrode may be the other one of the positive electrode or the negative electrode.

However, the shape of the case 11 is not limited to the hexahedron, and the case 11 may have various suitable shapes, such as cylinder, pouch, or the like.

Also, the cap plate 12 may be composed of a thin plate material with electrical conductivity, and may be combined with the opening of the case 11 to close and seal the opening.

Herein, the cap plate 12 may be electrically connected to either the first electrode or the second electrode to have a positive or negative polarity. Hereinafter, for convenience, the case 11 and the cap plate 12 according to the embodiment will be described as being electrically connected to the first electrode.

In addition, the electrode terminal 13 may be electrically connected to the first or second electrode. Hereinafter, for convenience, the electrode terminal 13 according to the embodiment will be described as being electrically connected to the second electrode.

Furthermore, a gasket 14 which is composed of an insulation material (for example, rubber or resin) may be disposed between the electrode terminal 13 and the cap plate 12 to electrically insulate the electrode terminal 13 and the cap plate 12.

Also, the first insulation member 20 according to the embodiment has a surface facing the cap plate 12, which is applied with an adhesive, to be combined with the cap plate 12. In this case, the electrode terminal 13 is inserted into a terminal combining hole 21 formed in the first insulation member 20, and the cap plate 12 is combined with a body 22 of the first insulation member 20 where the terminal combining hole is not formed. Accordingly, the first insulation member 20 is disposed between the protective circuit board 40 and the cap plate 12 to electrically insulate the protective circuit board 40 and the cap plate 12.

Also, the conductive connection member 30 according to the embodiment has one end combined with the electrode terminal 13 and the other end connected with the protective circuit board 40 to electrically connect the electrode terminal 13 with the protective circuit board 40.

In this case, the conductive connection member 30 may be disposed on the first insulation member 20 and attached between the protective circuit board 40 and the first insulation member 20.

The protective device 50 according to the embodiment may be attached on and electrically connected to the protective circuit board 40.

Herein, the protective device 50 includes one or more wires formed of a material (for example, alloy of lead and tin) which has electrical conductivity and is melted over a certain temperature, and an insulating resin surrounding the wires.

In addition, the protective circuit board 40 may be electrically connected to the first electrode through the lead tab 70.

More particularly, the lead tab 70 may include a protective circuit board connecting part 71 and a cap plate connecting part 72. Accordingly, the protective circuit board connecting part 71 may be combined with a surface facing the cap plate 12 of the protective circuit board 40, and the cap plate connecting part 72 may be combined with the cap plate 12 which is electrically connected to the first electrode.

Accordingly, according to the embodiment, a current path may be formed between the first electrode, the protective circuit board 40, the protective device 50, and the second electrode through both the conductive connection member 30 for electrically connecting the protective circuit board 40 with the electrode terminal 13 electrically connected to the second electrode, and the lead tab 70 for electrically connecting the protective circuit board 40 with the cap plate 12 electrically connected to the first electrode.

Accordingly, if an overcurrent flows inside the rechargeable battery 100 according to the embodiment so that the protective device 50 reaches a certain temperature, the protective device 50 is melted to block the current path between the bare cell 10 and the protective circuit module.

Accordingly, the second insulation member 80 according to the embodiment is attached between the protective circuit board 40 and the cap plate 12 to electrically insulate the protective circuit board 40 and the cap plate 12.

Herein, the second insulation member 80 may have surfaces facing the protective circuit board 40 and the cap plate 12, which are applied with an adhesive, to be combined with the protective circuit board 40 and the cap plate 12, respectively.

Also, the top cover 60 according to the embodiment may be formed through a hot-melt process. Herein, the top cover 60 may be formed by injecting a resin heated at a certain temperature into a space between the bare cell 10 and the protective circuit module.

Also, the top cover 60 may have a terminal connecting part 61 and first and second combining holes 62 and 63 where first and second combining members 64 and 65 are combined, respectively.

Accordingly, the top cover 60 may be formed on the bare cell 10 to cover the protective circuit board 40 and the protective device 50. The first and second combining members 64 and 65 may be inserted into the first and second combining holes 62 and 63 and thus inserted and fixed to the first and second combining parts 15 and 16, which are formed on the cap plate 12, through a hole formed in the cap plate connecting part 72 of the lead tab 70.

The bottom cover 90 according to the embodiment may include a bottom cover adhesive part 92 and a bottom cover body 91 including one or more protrusion parts.

The bottom cover 90 may be formed of a conductive resin and combined with the bottom surface of the bare cell 10 using the bottom cover adhesive part 92. Accordingly, the bottom cover 90 may insulate the bottom surface of the bare cell 10.

Figure 3:
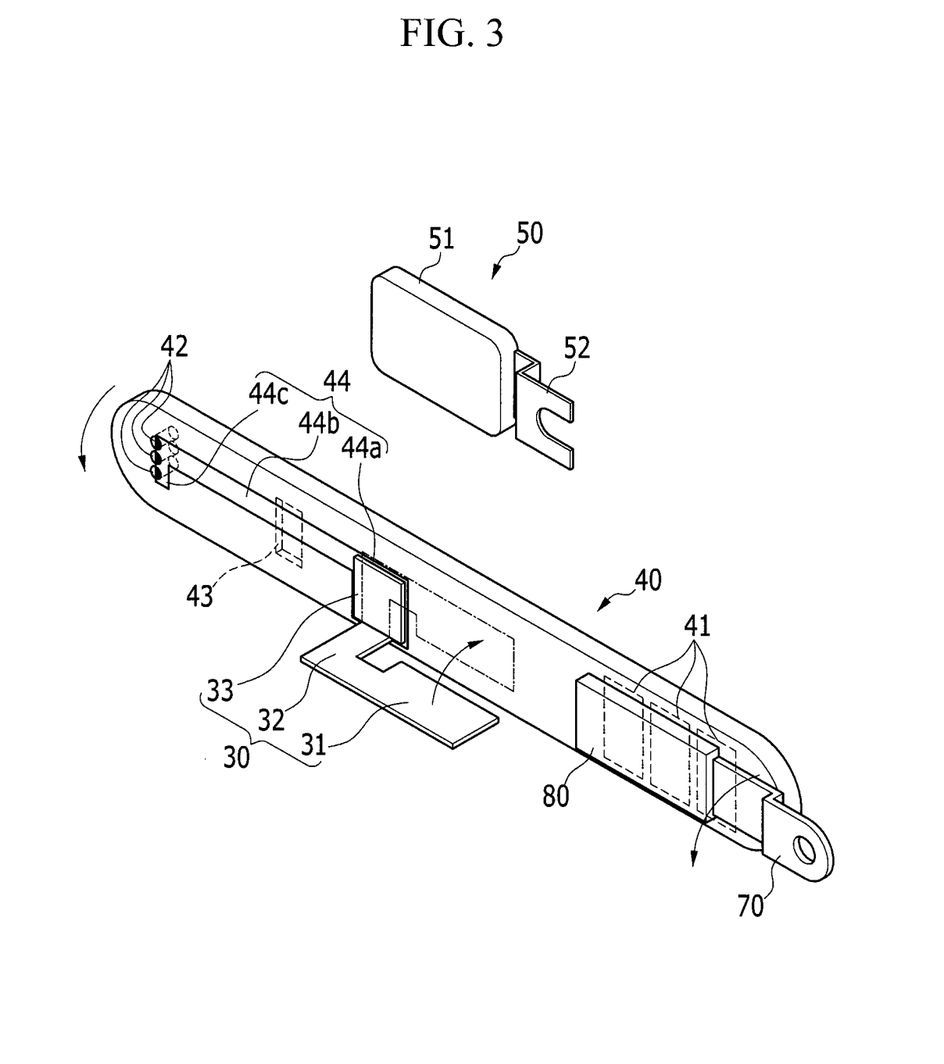
FIG. 3 is an exploded perspective view illustrating a protective device and a protective circuit board of FIG. 1.
Figure 4:
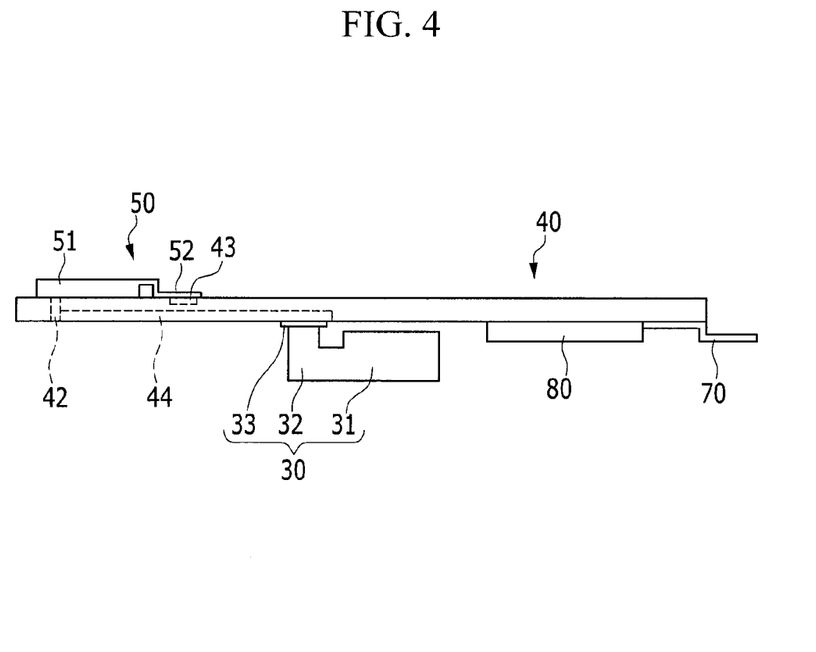
FIG. 4 is a side elevational view illustrating combination of the protective device and the protective circuit board of FIG. 3.

FIG. 3 is an exploded perspective view illustrating a protective device and a protective circuit board of FIG. 1, and FIG. 4 is a side elevational view illustrating combination of the protective device and the protective circuit board of FIG. 3.

For more detailed description of the protective circuit board 40 according to an embodiment with reference to FIGS. 3 and 4, the protective circuit board 40 may include a protective circuit, an outer terminal 41, one or more through holes 42, a protective device connection pattern 43, and an electrode connecting part 44.

Herein, the outer terminal 41 may be connected to the protective circuit formed in the protective circuit board 40, using soldering.

In this case, the second insulation member 80 is attached between the protective circuit board 40 and the cap plate 12 to prevent lead from being penetrated between the protective circuit board 40 and the cap plate 12 when the outer terminal 41 is connected to the protective circuit board 40 with soldering.

At least one through hole 42 may be formed through the protective circuit board 40 at one end of the protective circuit board 40.

Also, the electrode connecting part 44 according to the embodiment may be formed by forming a groove at the bottom surface of the protective circuit board 40 and filling the groove with a conductive material.

Herein, the electrode connecting part 44 according to the embodiment may include a conductive connection member combining part 44a, a protective device combining part 44c, and an electrode connecting part body 44b for connecting the conductive connection member combining part 44a with the protective device combining part 44c.

Also, the protective device combining part 44c may be extended up to the top surface of the protective circuit board 40 through the through hole 42.

The conductive connection member 30 may include an electrode terminal connecting part 31, a body 32, and a protective circuit board combining part 33. The protective circuit board combining part 33 may be connected to the conductive connection member combining part 44a in a method such as soldering.

Also, the protective circuit board 40 may be combined with a lead tab 70 at one end, and may be combined via the lead tab 70 with the cap plate 12 electrically connected to the first electrode.

The protective device 50 according to an embodiment may include a protective device body 51 and a protective device protrusion 52 extended at one side of the protective device body 51.

The protective device protrusion 52 may be electrically connected with the protective device connection pattern 43 formed in the protective circuit board 40. Herein, a gap between the groove formed in the protective device protrusion 52 and the protective device connection pattern 43 may be soldered to combine the protective device protrusion 52 with the protective device connection pattern 43.

Finally, the protective device 50 may be combined with the protective device connection pattern 43 of the protective circuit board 40 to be electrically connected with the protective circuit board 40. Thus, the protective device 50 may be electrically connected to the first electrode through the lead tab 70 electrically connected to the protective circuit board 40.

Herein, the protective device body 51 is attached on a portion of the top surface of the protective circuit board 40, where the through hole 42 is formed. Thus, the bottom surface of the protective device body 51 may be contacted with the electrode connecting part 44 along the through hole 42 of the protective circuit board 40.

Accordingly, the protective device 50 may be electrically connected to the electrode terminal 13 through the electrode connecting part 44.

In this case, the protective device body 51 is combined with the protective circuit board 40, using soldering.

In addition, according to the embodiment, when the protective circuit board 40 is attached on the cap plate 12, the body 32 of the conductive connection member 30 may be curved in a direction of the arrow shown in FIG. 3 toward the protective circuit board combining part 33.

Accordingly, as shown in FIG. 4, the protective circuit board combining part 33 and the body 32 of the conductive connection member 30 may be overlapped and attached between the protective circuit board 40 and the cap plate 12.

Also, according to the embodiment, the protective device 50 may be attached on the protective circuit board 40 and electrically connected to the electrode connecting part 44 extended to the top surface of the protective circuit board 40 through the through hole of the protective circuit board 40 and the protective device connection pattern 43 formed on the protective circuit board 40.

Accordingly, the protective device 50 may be attached on the protective circuit board 40 without an additional element for connection to the protective circuit board 40 and may be electrically connected to the protective circuit board 40 and the electrode terminal 13.

Accordingly, according to the embodiment, since there is no need for the additional element for combining the protective circuit board 40 with the protective device 50, the protective circuit board 40 and the protective device 50 may be easily combined to easily manufacture the protective circuit module.

Also, according to the embodiment, the protective device 50 is attached in direct contact with the protective circuit board 40. Thus, there is no need for an additional element for combining the protective circuit board 40 with the protective device 50.

Accordingly, according to the embodiment, it is possible to reduce volume in the protective circuit module including protective circuit board 40 and the protective device 50.

Also, the protective circuit module may be assembled by stacking the protective circuit board 40 on the curved conductive connection member 30 and then stacking the protective device 50 on the protective circuit board 40. Thus, it is also possible to simplify a process of assembling the protective circuit module and the bare cell 10.

Figure 5:
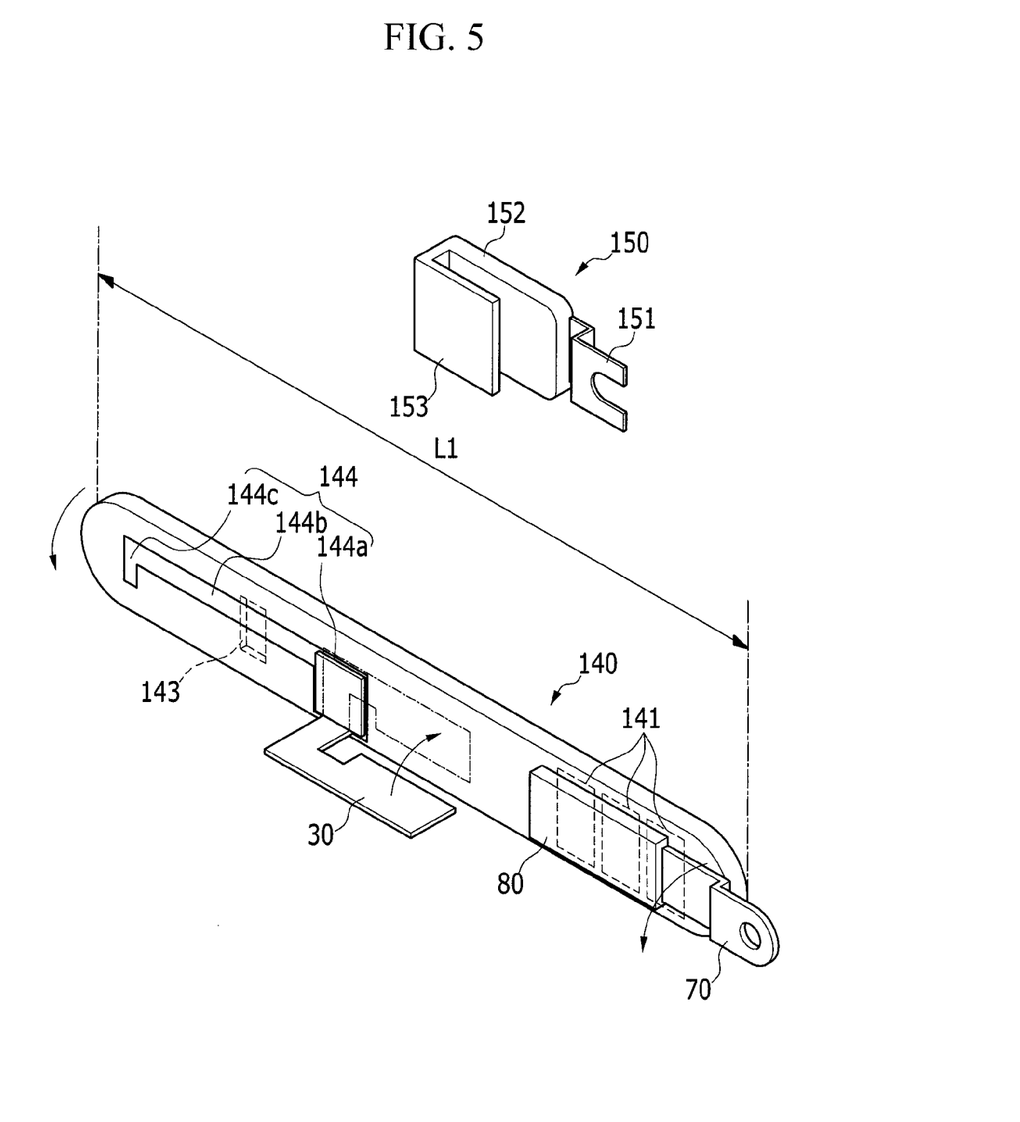
FIG. 5 is an exploded perspective view illustrating a protective device and a protective circuit board according to a second embodiment of the present invention.
Figure 6:
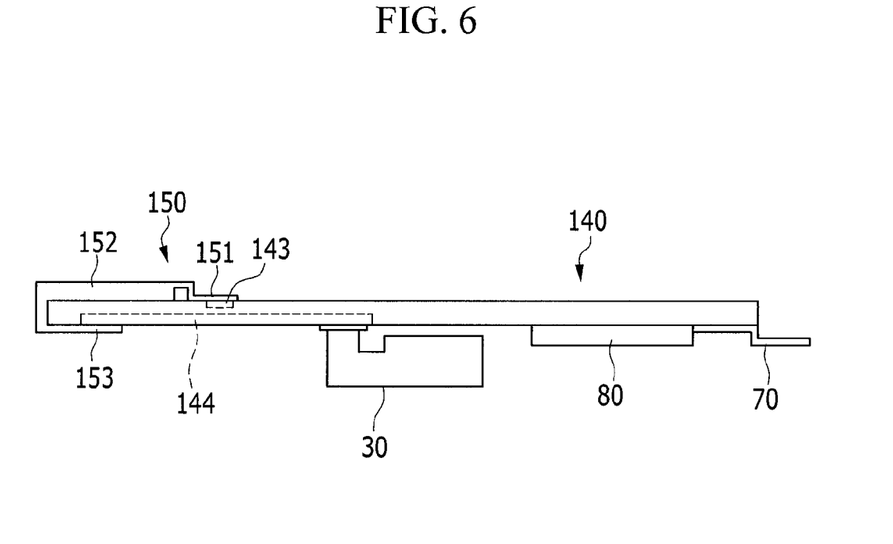
FIG. 6 is a side elevational view illustrating combination of the protective device and the protective circuit board of FIG. 5.

FIG. 5 is an exploded perspective view illustrating a protective device and a protective circuit board according to a second embodiment of the present invention, and FIG. 6 is a side elevational view illustrating combination of the protective device and the protective circuit board of FIG. 5.

Referring to FIGS. 5 and 6, a rechargeable battery according to an embodiment has the same configuration as the rechargeable battery 100 according to the first embodiment, other than a protective circuit board 140 and a protective device 150.

Accordingly, a detailed description of the same configuration as the rechargeable battery 100 according to the first embodiment will not be provided again.

To provide a detailed description of the protective circuit board 140 according to the embodiment with reference to FIG. 5, the protective circuit board 140 may include a protective circuit, an outer terminal 141, a protective device connection pattern 143, and an electrode connecting part 144.

However, the outer terminal 141, the protective device connection pattern 143, and the electrode connecting part 144 according to the embodiment may have the same configuration as the outer terminal 41, the protective device connection pattern 43, and the electrode connecting part 44 according to the first embodiment of the present invention. Accordingly, a detailed description of the outer terminal 141, the protective device connection pattern 143 and the electrode connecting part 144 of the protective circuit board 140 will not be provided again.

The electrode connecting part 144 according to the embodiment may include a conductive connection member combining part 144a, a protective device combining part 144c, and an electrode connecting part body 144b for connecting the conductive connection member combining part 144a with the protective device combining part 144c.

Also, the protective device 150 according to the embodiment may include a protective device body 152, a protective device protrusion 151 extended at one side of the protective device body 152, and a fixing part 153 curved and extended at the opposite of the surface where the protective device protrusion 151 is formed.

For example, the fixing part 153 according to the embodiment is extended in a direction approximately vertical to the bottom surface of the protective device body 152 and curved in a direction approximately parallel with the bottom surface of the protective device body 152.

Referring to FIG. 6, the protective device protrusion 151 may be electrically connected to the protective device connection pattern 143 formed in the protective circuit board 140. Herein, a gap between the groove formed in the protective device protrusion 151 and the protective device connection pattern 143 may be connected using soldering.

Also, the fixing part 153 of the protective device 150 may be inserted and fixed to one end of the protective circuit board 140 and thus positioned on the protective device combining part 144c.

Accordingly, the protective device 150 may be electrically connected to the electrode connecting part 144 through the fixing part 153 of the protective device 150.

Finally, according to the embodiment, the protective device body 152 and the protective device protrusion 151 may be attached on the top surface of the protective circuit board 140, and the fixing part 153 is combined with the bottom surface of the protective circuit board 140 and thus combined with the electrode connecting part 144. Thus, the protective device 150 may be electrically connected with the protective circuit board 140 and the electrode terminal 13.

In view of the above, the protective circuit module includes the protective circuit board 140 and the protective device 150. The protective circuit board 140 is electrically connected with the first electrode of the electrode assembly. The protective device 150 includes a first protective device portion mounted to a first surface of the protective circuit board 140 to be electrically connected with the protective circuit board 140, and a second protective device portion (e.g., the fixing part 153) electrically connected with the second electrode of the electrode assembly and mounted on a second surface of the protective circuit board 140, the second surface facing oppositely away from the first surface.

Here, the protective device 150 further includes a third protective device portion, and the first and second protective device portions extend from a same side of the third protective device portion along a same direction on the protective circuit board. In one embodiment, the third protective device portion is mounted on a third surface of the protective circuit board 140 to electrically connect the first protective portion with the second protective device portion, and the first surface of the protective circuit board 140 is connected with the second surface of the protective circuit board 140 via the third surface of the protective circuit board 140. In particular and as shown in FIG. 5 and FIG. 6, the first protective device portion includes the protective device body 152 and the protective device protrusion 151 extending at one side of the protective device body 152 and electrically connected with the first electrode on the first surface of the protective circuit board 140, the protective device body 152 including a protective chip or lead. The second protective device portion includes the fixing part 153 electrically connected with the second electrode on the second surface of the protective circuit board 140.

Accordingly, according to the embodiment, there is no need for an additional element for combining the protective circuit board 140 with the protective device 150, thereby easily manufacturing the protective circuit module, reducing volume in the protective circuit module, and simplifying a process of assembling the protective circuit module and the bare cell.

Also, the fixing part 153 of the protective device 150 is inserted and fixed to one end of the protective circuit board 140, thereby easily combining the protective device 150 and the electrode connecting part 144, and stably combining the protective device 150 and the protective circuit board 140.

Figure 7:
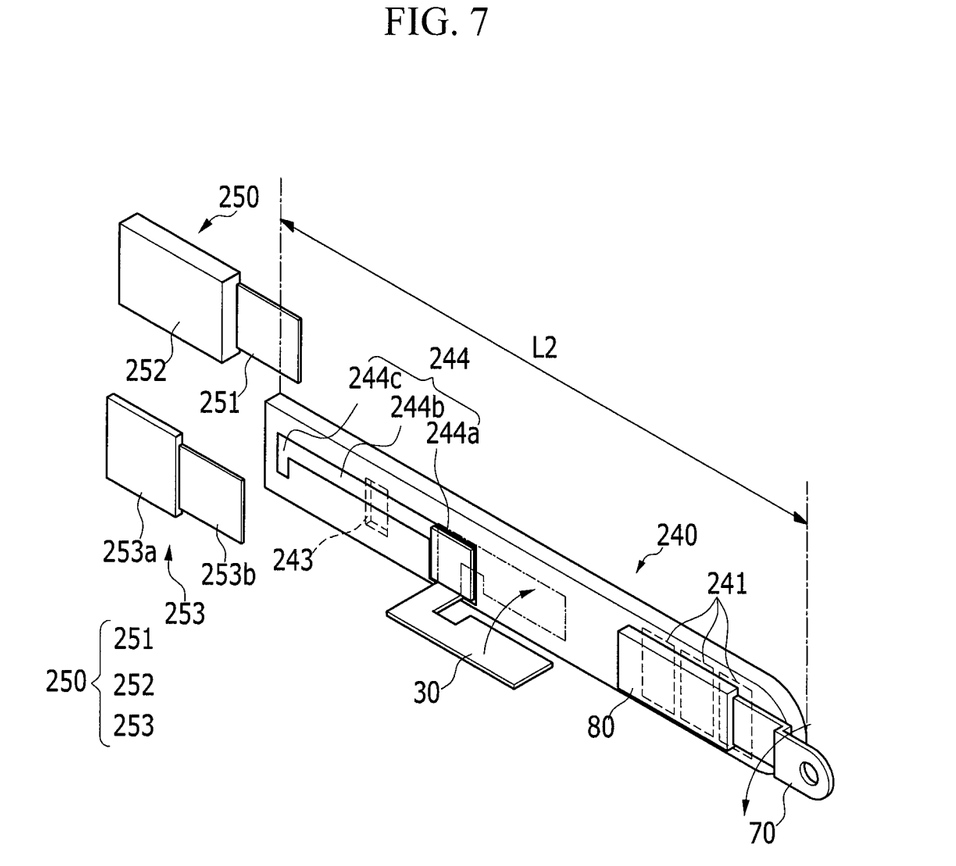
FIG. 7 is an exploded perspective view illustrating a protective device and a protective circuit board according to a third embodiment of the present invention.
Figure 8:
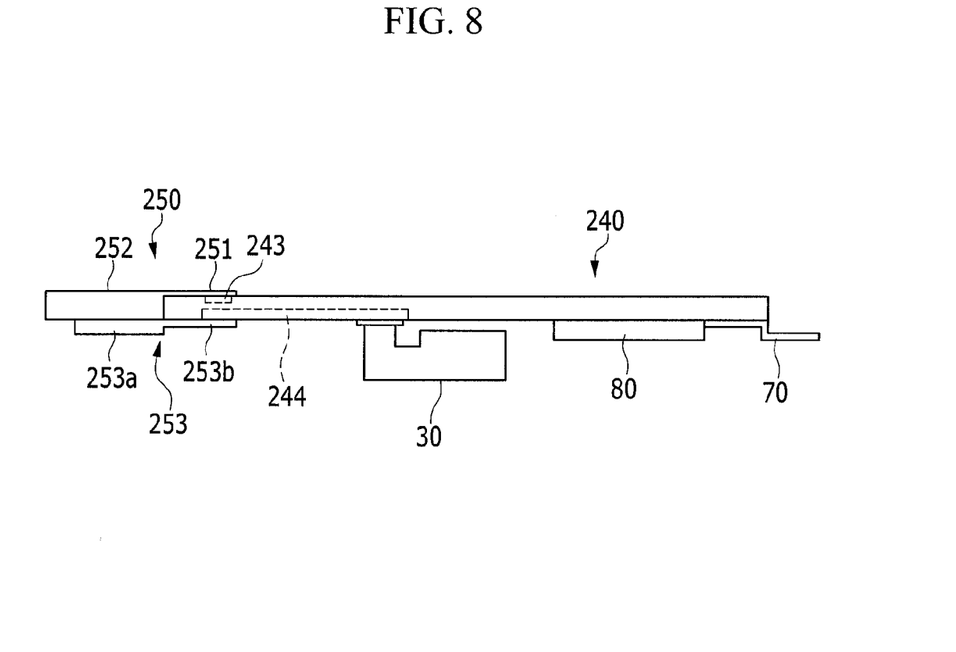
FIG. 8 is a side elevational view illustrating combination of the protective device and the protective circuit board of FIG. 7.

FIG. 7 is an exploded perspective view illustrating a protective device and a protective circuit board according to a third embodiment of the present invention, and FIG. 8 is a side elevational view illustrating combination of the protective device and the protective circuit board of FIG. 7.

Referring to FIGS. 7 and 8, a rechargeable battery according to an embodiment has the same configuration as the rechargeable battery 100 according to the first embodiment, other than a protective circuit board 240 and a protective device 250.

Accordingly, a detailed description of the same configuration as the rechargeable battery 100 according to the first embodiment will not be provided again.

To provide a detailed description of the protective circuit board 240 according to an embodiment with reference to FIG. 7, the protective circuit board 240 may include a protective circuit, an outer terminal 241, a protective device connection pattern 243, and an electrode connecting part 244.

However, the outer terminal 241, the protective device connection pattern 243, and the electrode connecting part 244 according to the embodiment may have the same configuration as the outer terminal 41, the protective device connection pattern 43, and the electrode connecting part 44 according to the first embodiment of the present invention. Accordingly, a detailed description of the outer terminal 241, the protective device connection pattern 243, and the electrode connecting part 244 of the protective circuit board 240 will not be provided again.

The electrode connecting part 244 according to the embodiment may include a conductive connection member combining part 244a, a protective device combining part 244c, and an electrode connecting part body 244b for connecting the conductive connection member combining part 244a with the protective device combining part 244c.

Also, the protective device 250 according to the embodiment may include a protective device body 252, a protective device protrusion 251 extended at one side of the protective device body 252, and a protective device supporting part 253 combined with the bottom surface of the protective device body 252.

Herein, the protective device supporting part 253 may include a supporting part body 253a and a supporting part protrusion 253b extended at one end of the supporting part body 253a.

Referring to FIG. 8, the protective device body 252 according to the embodiment may be attached to one end of the protective circuit board 240, and the protective device protrusion 251 may be attached to the top surface of the protective circuit board 240 and electrically connected to the protective device connection pattern 243.

Also, the supporting part 253 may be combined to the bottom surface of the protective device 250.

More particularly, the supporting part body 253a of the supporting part 253 may be combined to the bottom surface of the protective device body 252, and the supporting part protrusion 253b may be combined to the protective device combining part 244c.

Herein, the supporting part body 253a may be combined to the bottom surface of the protective device body 252 using welding, and the supporting part protrusion 253b may be combined to the protective device combining part 244c with soldering.

The protective circuit body 252 of the protective device 250 according to the embodiment may be attached on a side surface of the protective circuit board 240, not on the top surface of the protective circuit board 240.

Accordingly, since the protective device body 252 is not attached to the top surface of the protective circuit board 240 according to the embodiment, the protective circuit board 240 may be designed to be relatively short in length, compared with when the protective device body 252 is combined to the top surface of the protective circuit board 240.

That is, a length (L2) in a length direction of the protective circuit board 240 according to the third embodiment may be designed as being less than a length (L1) in a length direction of the protective circuit board 140 according to the second embodiment of the present invention (see also FIG. 5) by the length of the protective device body 252.

Also, according to the third embodiment, the protective device body 252 may be attached on the side surface of the protective circuit board 240, the protective device protrusion 251 may be attached on the top surface of the protective circuit board 240, the supporting part body 253a is combined with the bottom surface of the protective device body 252, and the supporting part protrusion 253b is combined with the electrode connecting part 244. Thus, the protective device 250 may be electrically connected with the protective circuit board 240 and the electrode terminal 13.

In view of the above, the protective circuit module includes the protective circuit board 240 and the protective device 250. The protective circuit board 240 is electrically connected with the first electrode of the electrode assembly. The protective device 250 includes a first protective device portion mounted to a first surface of the protective circuit board 240 to be electrically connected with the protective circuit board, and a second protective device portion (e.g., the supporting part protrusion 253b) electrically connected with the second electrode of the electrode assembly and mounted on a second surface of the protective circuit board 240, the second surface facing oppositely away from the first surface.

Here, the protective device 250 further includes a third protective device portion, and the first and second protective device portions extend from a same side of the third protective device portion along a same direction on the protective circuit board 240. In one embodiment, the third protective device portion is mounted on a third surface of the protective circuit board 240 to electrically connect the first protective portion with the second protective device portion, and the first surface of the protective circuit board 240 is connected with the second surface of the protective circuit board 240 via the third surface of the protective circuit board 240. In particular and as shown in FIG. 7 and FIG. 8, the third protective device portion includes: the protective device body 252 extending from and attached to the third surface of the protective circuit board, and the protective device supporting part body 253a. The protective device body 252 includes a protective chip or lead. The protective device supporting part body 253a supports a surface of the protective device body 252. The first protective device portion includes the protective device protrusion 251 extending at one side of the protective device body 252 and electrically connected with the first electrode on the first surface of the protective circuit board 240, and the second protective device portion includes the supporting part protrusion 253b extending at one side of the protective device supporting part body 252 and electrically connected with the second electrode on the second surface of the protective circuit board 240. Here, the length of the protective circuit board 240 is less than the length of the protective circuit module, and/or the length of the protective circuit module encompasses both the length of the protective device body 252 and the length of the protective circuit board 240.

Accordingly, according to the embodiment, there is no need for an additional element for combining the protective circuit board 240 with the protective device 250, thereby easily manufacturing the protective circuit module, reducing volume in the protective circuit module, and simplifying a process of assembling the protective circuit module and the bare cell.

Also, the supporting part 253 may be combined with bottom surfaces of the protective device body 252 and the protective circuit board 240, thereby easily combining the protective device 250 and the electrode connecting part 244, and stably combining the protective device 250 with the protective circuit board 240.

Figure 9:
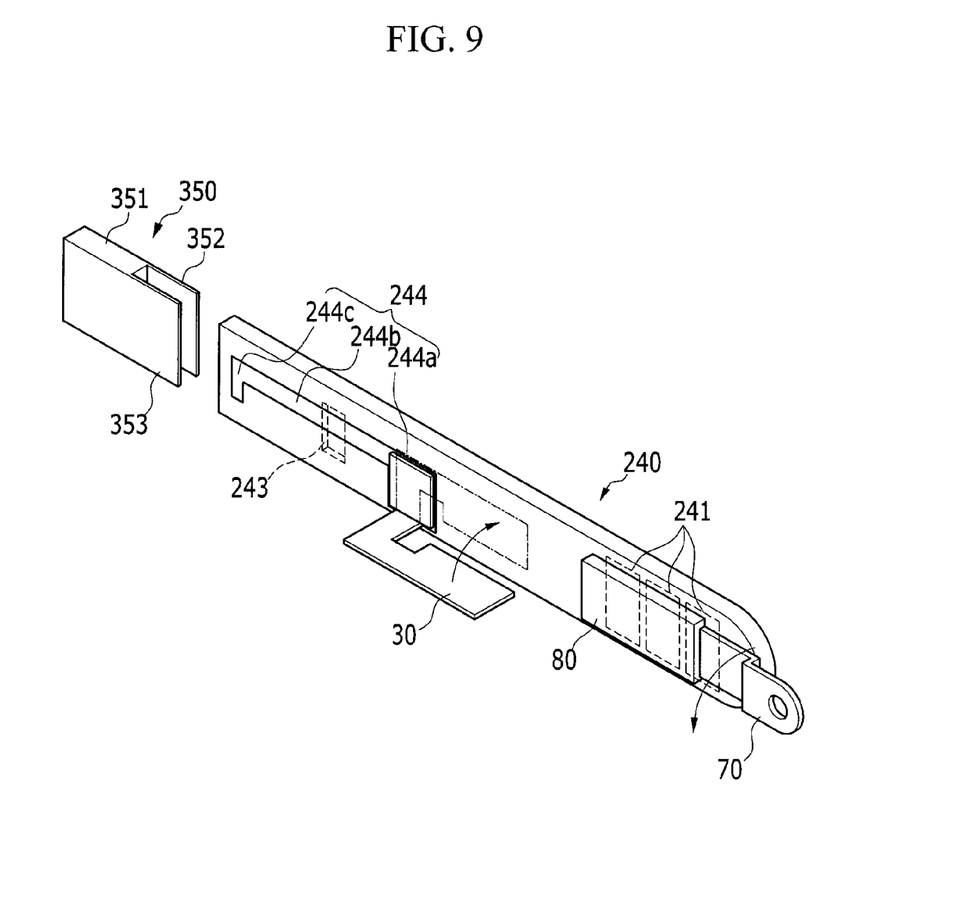
FIG. 9 is an exploded perspective view illustrating a protective device and a protective circuit board according to a fourth embodiment of the present invention.
Figure 10:
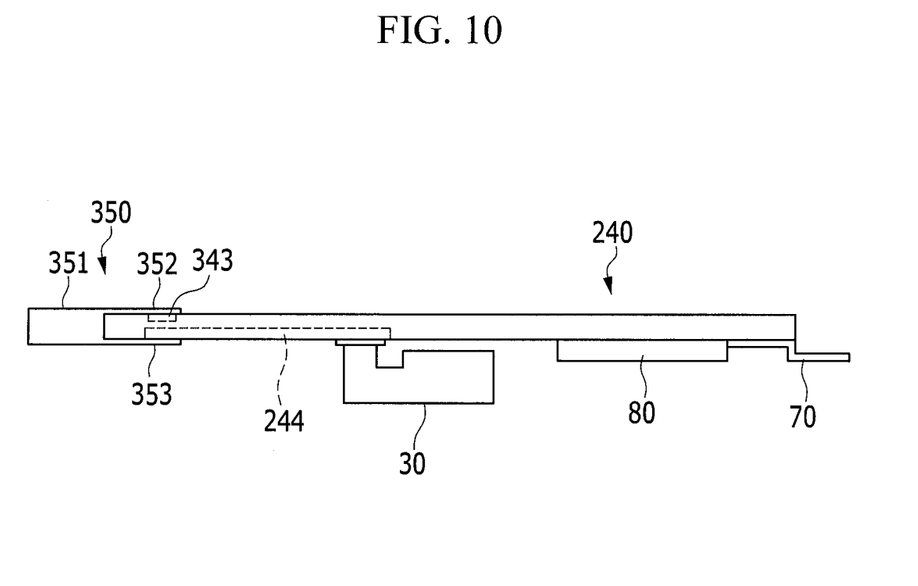
FIG. 10 is a side elevational view illustrating combination of the protective device and the protective circuit board of FIG. 9.

FIG. 9 is an exploded perspective view illustrating a protective device and a protective circuit board according to a fourth embodiment of the present invention, and FIG. 10 is a side elevational view illustrating combination of the protective device and the protective circuit board of FIG. 9.

Referring to FIGS. 9 and 10, a rechargeable battery according to the embodiment has the same configuration as the rechargeable battery according to the third embodiment, other than the protective device 350.

Accordingly, a detailed description of the same configuration as the rechargeable battery according to the third embodiment will not be provided again.

Also, the protective device 350 according to the embodiment may include a protective device body 351, and first and second protective device protrusions 352 and 353 extended at one side of the protective device body 351 and separated from each other.

The protective device body 351 according to the embodiment may be attached to the side surface of the protective circuit board 240, which may be inserted between the first and second protective device protrusions 352 and 353.

Accordingly, as shown in FIG. 10, the first protective device protrusion 352 may be combined with the top surface of the protective circuit board 240 and thus electrically connected with the protective device connection pattern 243.

Also, the second protective device protrusion 353 may be combined with the bottom surface of the protective circuit board 240 and thus electrically connected to the protective device combining part 244c of the electrode connecting part 244.

In view of the above, the protective circuit module includes the protective circuit board 240 and the protective device 350. The protective circuit board 240 is electrically connected with the first electrode of the electrode assembly. The protective device 350 includes a first protective device portion (e.g., the first protective device protrusion 352) mounted to a first surface of the protective circuit board 240 to be electrically connected with the protective circuit board, and a second protective device portion (e.g., the second protective device protrusion 353) electrically connected with the second electrode of the electrode assembly and mounted on a second surface of the protective circuit board 240, the second surface facing oppositely away from the first surface.

Here, the protective device 350 further includes a third protective device portion, and the first and second protective device portions extend from a same side of the third protective device portion along a same direction on the protective circuit board 240. In one embodiment, the third protective device portion is mounted on a third surface of the protective circuit board 240 to electrically connect the first protective portion with the second protective device portion, and the first surface of the protective circuit board 240 is connected with the second surface of the protective circuit board 240 via the third surface of the protective circuit board 240. In particular and as shown in FIG. 9 and FIG. 10, the third protective device portion includes a protective device body 351 extending from and attached to the third surface of the protective circuit board. The first protective device portion includes the first protective device protrusion 352 extending at one side of the protective device body 351 and electrically connected with the first electrode on the first surface of the protective circuit board 240, and the second protective device portion includes the second protective device protrusion 353 also extending at the one side of the protective device body 351. Here, the second protective device protrusion 353 is separated from the first protective device protrusion 352, and electrically connected with the second electrode on the second surface of the protective circuit board 240. In one embodiment, the protective device body 351 includes a protective chip or lead, and/or the protective device body 351 is integrally provided with the first protective device protrusion 352 and the second protective device protrusion 353.

Accordingly, according to the embodiment, there is no need for an additional element for combining the protective circuit board 240 with the protective device 350, thereby easily manufacturing the protective circuit module, reducing volume in the protective circuit module, and simplifying a process of assembling the protective circuit module and the bare cell.

In addition, according to the embodiment, the protective device 350 may be easily and stably connected with the protective circuit board 240.

While embodiments of the present invention have been described, it is to be understood that the invention is not limited thereto, but is intended to cover various modifications and equivalent arrangements included within the spirit and scope of the appended claims, description, and drawings.

What is claimed is:

1. A rechargeable battery comprising:
    a bare cell comprising:
        a case for housing an electrode assembly, and
        a cap plate for capping an opening of the case; and
    a protective circuit module comprising:
        a protective circuit board electrically connected with a first electrode of the electrode assembly, and
        a protective device comprising:
            a first protective device portion mounted to a first surface of the protective circuit board to be electrically connected with the protective circuit board,
            a second protective device portion electrically connected with a second electrode of the electrode assembly and mounted on a second surface of the protective circuit board, the second surface facing oppositely away from the first surface, and
            a third protective device portion mounted on a third surface of the protective circuit board to electrically connect the first protective portion with the second protective device portion,
        wherein:
            the first surface of the protective circuit board is connected with the second surface of the protective circuit board via the third surface of the protective circuit board;
            the third protective device portion comprises a protective device body extending from and attached to the third surface of the protective circuit board;
            the protective device body comprises a protective chip;
            the first protective device portion comprises a first protective device protrusion extending at one side of the protective device body and electrically connected with the first electrode on the first surface of the protective circuit board;
            the second protective device portion comprises a second protective device protrusion also extending at the one side of the protective device body, separated from the first protective device protrusion, and electrically connected with the second electrode on the second surface of the protective circuit board; and
            the protective device body is integrally provided with the first protective device protrusion and the second protective device protrusion.

2. The rechargeable battery of claim 1, further comprising a lead tab comprising:
    a protective circuit board connecting part electrically connected with the protective circuit board; and
    a cap plate connecting part electrically connected with the first electrode.

3. The rechargeable battery of claim 1, further comprising a conductive connection member comprising:
    an electrode terminal part electrically connected with the second electrode; and
    a protective circuit board combining part electrically connected with the second protective device portion.

4. The rechargeable battery of claim 3, wherein:
    the conductive connection member further comprises a body electrically connecting the electrode terminal part with the protective circuit board combining part, the body being a curved body curved toward the protective circuit board combining part to be overlapped and attached between the protective circuit board and the cap plate.

5. The rechargeable battery of claim 4, wherein:
the protective circuit board is stacked on the curved body of the conductive connection member.

6. The rechargeable battery of claim 4, wherein the protective circuit board comprises:
a protective device connection pattern electrically connected with the first electrode on the first surface; and
an electrode connecting part electrically connected with the second electrode via the conductive connection member on the second surface and insulated from the protective device connection pattern.

7. The rechargeable battery of claim 3, wherein:
the protective circuit board combining part is electrically connected with the second protective device portion on the second surface of the protective circuit board.

8. The rechargeable battery of claim 3, further comprising an insulation member between the protective circuit board and the cap plate, wherein the conductive connection member is disposed on the insulation member and attached between the protective circuit board and the insulation member.

9. The rechargeable battery of claim 8, wherein:
the insulation member has a terminal combining hole; and
the electrode terminal part of the conductive connection member is connected with the second electrode via a second electrode terminal penetrating through the terminal combining hole.

10. The rechargeable battery of claim 1, wherein:
the protective device further comprises a third protective device portion; and
the first and second protective device portions extend from a same side of the third protective device portion along a same direction on the protective circuit board.

11. The rechargeable battery of claim 1, wherein:
the second protective device portion comprises a fixing part electrically connected with the second electrode on the second surface of the protective circuit board.

12. The rechargeable battery of claim 1, wherein:
a protective device supporting part body supports a surface of the protective device body.

13. The rechargeable battery of claim 1, wherein the protective circuit board comprises an outer terminal for electrically connecting the electrode assembly to an external device.

14. The rechargeable battery of claim 13, further comprising an insulating member between the protective circuit board and the cap plate at where the outer terminal is positioned, to protect from a penetration of a lead between the protective circuit board and the cap plate.

15. The rechargeable battery of claim 1, further comprising a cover covering the protective circuit board and the protective device, and injection molded into a space between the bare cell and the protective circuit module.

* * * * *